United States Patent [19]

Gasper, Jr. et al.

[11] 4,203,389
[45] May 20, 1980

[54] DISSOLVED OXYGEN REGULATOR

[75] Inventors: Martin J. Gasper, Jr.; Theodore W. Black, both of Allentown, Pa.

[73] Assignee: Rodale Resources, Inc., Emmaus, Pa.

[21] Appl. No.: 950,990

[22] Filed: Oct. 13, 1978

[51] Int. Cl.² ............................................. A01K 63/00
[52] U.S. Cl. ..................................................... 119/3
[58] Field of Search ...................... 119/3, 2, 4; 73/23; 261/119 R; 204/1 Y, 195 P

[56] References Cited

U.S. PATENT DOCUMENTS

| 3,320,928 | 5/1967 | Smith | 119/3 |
| 3,341,450 | 9/1967 | Ciabattari et al. | 261/119 R X |
| 3,685,346 | 8/1972 | Molloy | 73/23 |
| 4,116,164 | 9/1978 | Shabi et al. | 119/3 |

Primary Examiner—Hugh R. Chamblee
Attorney, Agent, or Firm—D. Paul Weaver

[57] ABSTRACT

An apparatus is disclosed herein which automatically regulates the amount of oxygen in a body of water by sensing the oxygen content of the water and activating a spray aerator whenever the percentage of oxygen falls below a predetermined value.

13 Claims, 4 Drawing Figures

DISSOLVED OXYGEN REGULATOR

THE INVENTION

This invention relates to a means to automatically control a spray aerator for a fish pond by determining the oxygen content of the water and controlling the aerator as a function thereof.

BACKGROUND OF THE INVENTION

Modern pressures on natural resources have decreased their availability and in the case of fish has made this important protein source more difficult and expensive to obtain in the quantities required by our increasing population. As a result, the ancient art of fish farming or fish culture is flourishing and numerous ponds across the country are being constructed or devoted to raising fish as a crop.

The productivity or yield of a fish pond is a direct function of the dissolved oxygen contained in the water. The fish farming industry attempts to maintain pond populations at a maximum and this results in the average fish farmer operating his ponds at the brink of disaster. As the fish increase in size, their oxygen demand increases and the amount of ammonia and nitrate excreted by the fish increases which increases other plant life in the pond. This plant life creates oxygen when exposed to sufficient quantities of solar radiation but at night it utilizes the dissolved oxygen in the pond. Thus the oxygen level can suddenly diminish to the critical point and the fish begin to die. The first indication that a farmer has of a potential oxygen depletion problem is the fish gasping for oxygen at the surface of the water in the middle of the night. When this stage of oxygen depletion has been reached, it is generally too late and the fish are belly up by morning and the investment in the oxygen depleted pond is lost with the rotting fish suitable only for fertilizer.

Oxygen depletion has been combated in the past by a number of systems but they are all costly to operate and result in decreased profits from the average fish pond. In many instances their operation becomes so costly that fish farming ceases to be a profitable enterprise. One approach to the oxygen depletion problem is the concept of running aerators all night long to ensure that critical oxygen levels are not exceeded. This constant running of aerator systems prevents oxygen depletion but, as previously stated, becomes so costly that profits are minimized and in some cases financial losses occur.

The aerating systems utilized vary from very crude mechanical devices which flail the water surface and are powered by tractors to the very efficient spray type aerators such as those manufactured by Rodale Resources Incorporated which sprays pond water into the air in the form of water droplets dimensioned to minimize evaporation but maximize oxygen absorption. None of these devices regulate the amount of oxygen in the water and therefore their operation must be manually controlled and the process of maintaining adequate amounts of dissolved oxygen in the pond becomes inefficient as previously discussed.

Systems which automatically maintain a predetermined oxygen content in a water source have been developed but they are more costly to operate than continuously running the prior art mechanical aerators. For instance the device disclosed in the O. C. Smith U.S. Pat. No. 3,320,928 on "Apparatus And Method For Aerating A Body Of Water" teaches the concept of placing a large dome over the surface of the water and forcing oxygen gas through a pipe having an opening near the bottom of the body of water so that the oxygen bubbles up through the water. The oxygen trapped under the dome and the air contained therein are recirculated with the oxygen pumped to the bottom of the pond in an attempt to increase the efficiency of the system. However, this system does not increase the oxygen level of the pond as readily as does the mechanical spray system and oxygen gas is costly relative to the market value of the fish in the pond. The mechanism for recirculating the oxygen is also an added expense which decreases the overall efficiency of the fish farming system utilizing such devices.

J. Walker, U.S. Pat. No. 3,872,003 on "High Oxygen Treatment Of Waste With Selective Oxygen Recirculation" and E. Abrams et al, U.S. Pat. No. 4,069,147 on "Waste Water Treatment With Oxygen" are further examples of the concept of circulating oxygen gas through a body of liquid in response to signals from an oxygen sensor located within the liquid. These systems are not directed to fish culture but the techniques are applicable to the industry. They suffer from the same disadvantages discussed with respect to the O. C. Smith method of aerating a body of water by pumping oxygen gas therethrough.

OBJECTIVES OF THE INVENTION

In view of the obvious inability of the prior art oxygenation systems to maintain the oxygen level in a fish pond at the desired level, it is a primary purpose of the present invention to provide a means to automatically control a mechanical aerator as a function of the dissolved oxygen content of the water body being treated.

A further objective of the present invention is to provide an automatic oxygenation system for fish culture ponds which will permit the farmer to regulate the minimum dissolved oxygen content level of his ponds.

A still further objection of the invention is to provide a control system for a spray aerator which is responsive to the oxygen content of a body of water.

It is a further objective of the present invention to provide a dissolved oxygen gas sensor in combination with electronic processing circuitry adapted to provide a control function in response to predetermined output voltages of said sensor.

It is a still further objective of the present invention to provide an automatic fish pond aerator which is both economical to produce and operate.

The foregoing and other objectives of the invention will become apparent in light of the drawings, specification and claims contained herein.

SUMMARY OF THE INVENTION

The present invention is a system to control the operation of a fish pond aerator to maintain a predetermined dissolved oxygen level in the pond. This is accomplished by utilizing an oxygen sensing probe which is immersed in the pond and produces a voltage level as a function of the oxygen content of the water. The voltage level or analog signal is amplified in a parallel channel system wherein each channel includes a comparator which provides control signals to a logic circuit that activates the power source to the mechanical aerator.

DESCRIPTION OF THE INVENTION

Figure 1:
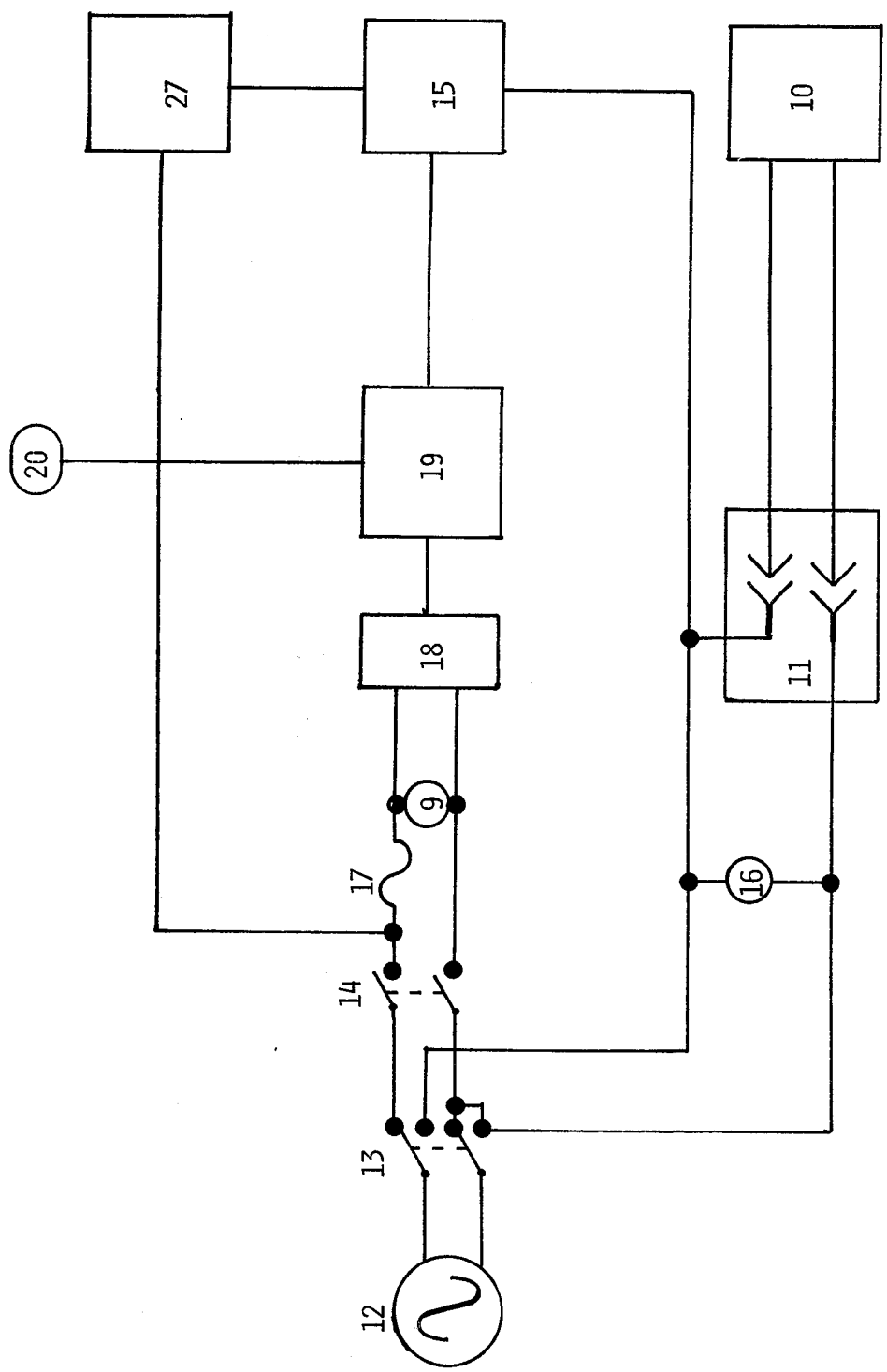
FIG. 1 is a block diagram of the invention illustrating the dissolved oxygen regulator and its interconnection with a fish pond aerator.

FIG. 1 illustrates a typical interconnection of the subject invention adapted to aerate a fish pond. The aerator 10 is located in the pond and includes an electric motor which pumps the pond water through a spray means. The pump motor is powered by an electrical interconnection with an output recepticle 11 which is coupled to a 110 volt power source 12 through function switch 13. Function switch 13 is a ganged pair of single-pole double-throw switches which in the illustrated position provide current to the automatic control circuitry through power switch 14. Power switch 14 connects the 110 volts to the output recepticle via normally opened relay 15. A lamp 16 is in parallel with the output recepticle and functions as an indicator which is illuminated whenever function switch 13 is in the illustrated automatic mode and normally opened relay 15 is closed or the function switch is in the manual on mode.

In addition to providing current through relay contacts 15, power switch 14 provides the 110 volt input from the power source 12 through fuse 17 to power source 18. Power source 18 has an indicator lamp 9 across its input to provide an indication that power is applied to the automatic control circuitry.

The power supply 18 provides a regulated plus and minus 5 volts to the regulator 19 and through the regulator to probe 20. Probe 20 is immersed in the fish pond whose oxygen content is being regulated. The probe is responsive to oxygen molecules in the water and produces an analog voltage which is a direct function of the amount of oxygen dissolved in the pond water. This analog voltage is interpreted by the regulator and when the oxygen content of the pond falls below a predetermined level, the regulator energizes relay 15 causing current flow to the output recepticle 11. The output recepticle 11 then provides 110 volts to the motor of the aerator which in a preferred embodiment may be an aqua dome mechanical aerator.

Figure 2:
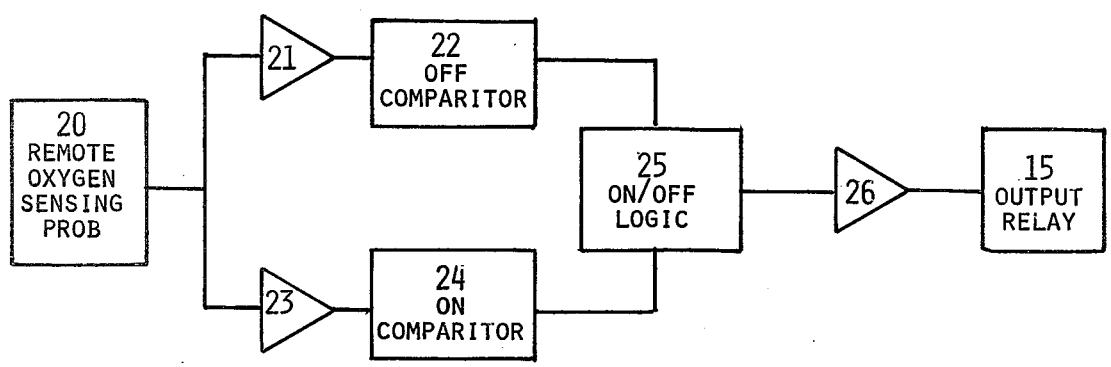
FIG. 2 is a block diagram of the dissolved oxygen regulator.

The oxygen regulator 19 of FIG. 1 contains two channels, illustrated in block diagram form in FIG. 2. Both channels are connected in parallel to the output of the oxygen sensing probe 20 and each channel is comprised of an amplifier and comparator. In FIG. 2 the channel comprised of an amplifier 21 and comparator 22 controls the off function of the system while the channel comprised of amplifier 23 and comparator 24 functions as the on channel. Both channnels are identical except for the reference potentials applied to the comparators.

The outputs of both the off comparator 22 and on comparator 24 are applied to an on-off logic circuit 25 which activates the output driving circuit 26 which in turn controls relay 15.

Figure 3:
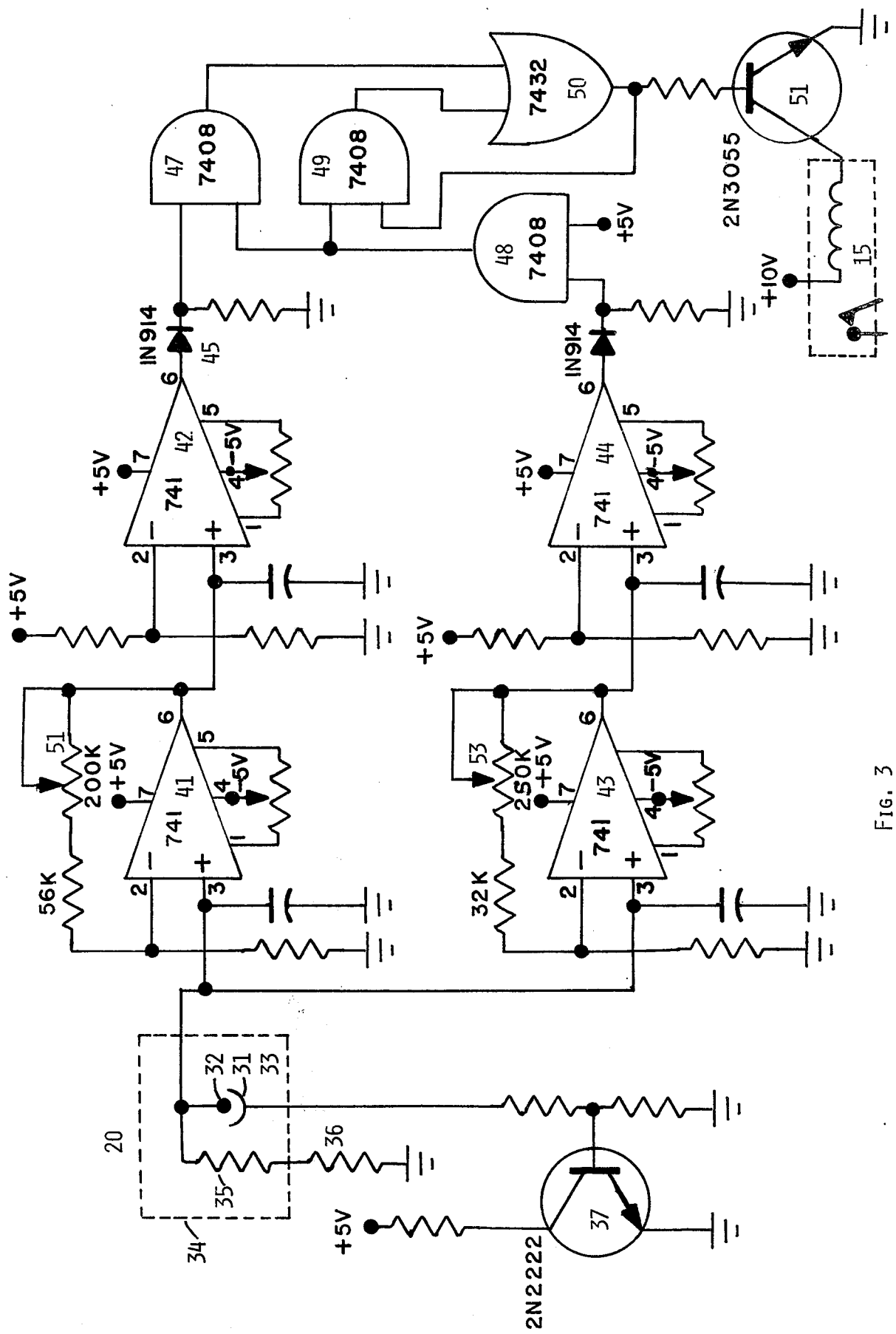
FIG. 3 is a schematic diagram of the dissolved oxygen regulator circuitry.

The oxygen probe 20 of FIGS. 1 and 2 is illustrated in more detail in FIG. 3. It is comprised of a gold cathode 31 and silver anode 32 immersed in a potassium chloride solution 33 and sealed in a container 34 which includes an oxygen permeable membrane. The conductivity of the potassium chloride solution surrounding the anode and cathode varies as a function of the dissolved oxygen contained therein. Thus when the probe 20 is immersed in a fish pond, the amount of dissolved oxygen in the pond water will be identical to the amount of oxygen in solution in the potassium chloride solution surrounding the cathode and anode of the probe.

The conductivity of the potassium chloride solution within the probe is proportional to the oxygen in solution so higher voltages will be passed from cathode to anode as the oxygen level increases and lower voltage levels will be conducted as the oxygen level decreases. The conductivity swing of a potassium chloride solution as a function of dissolved oxygen is small and temperature dependent. Therefore a precision thermistor 35 and resistor 36 is connected between anode 32 and ground so that the output of the oxygen probe 20 will approach a true function of the oxygen content of the water by the elimination of temperature induced errors in the probe operation.

To ensure proper operation of the system, a precise positive voltage must be applied to the cathode 31 of the oxygen probe. This is obtained in the preferred embodiment illustrated in FIG. 3 by applying a regulated 5 volts to a probe polarizing voltage divider comprised of transistor 37 and associated resistors.

Irregulated, positive voltage of the voltage divider transistor 37 passes through oxygen probe 20 which, in a preferred embodiment may be similar to the probe designed by the YSI Laboratory Instrument Company. The probe is similar to the one described herein and its output is applied to the off and on channels of FIG. 2 or FIG. 3. The first stage of the off channel in FIG. 3 is operational amplifier 41 and the first stage of the on channel is operational amplifier 43. These operational amplifiers are non-inverting and include feedback resistor series networks having a fixed resistor and a variable resistor for controlling the gain of the amplifier. These amplifiers have a very high gain because the output of oxygen probe 20, their input, is quite small. The off and on channels require different gains and therefore potentiometer 53 in the on channel operational amplifier feedback circuit is larger than potentiometer 51 in the off operational amplifier feedback circuit. Different gains are used for the off and on channels because the channel circuitry is essentially identical to minimize hardware requirements and it is necessary that one channel will create a voltage level which will activate the on logic while the other channel must generate a voltage level which will operate the off logic in response to appropriate outputs from oxygen probe 20. Thus in FIG. 3 it can be seen that the off channel amplifier will produce a higher voltage than the on channel amplifier 43 for a given input because the feedback loop range for the off channel amplifier 41 is from 56 Kohms to 256 Kohms while the range of the feedback loop for the on channel amplifier 43 is from 82 Kohms to 332 Kohms. The outputs of both off and on channel amplifiers 41 and 43 are applied to identical operational amplifiers 42 and 44 which are adapted to function as comparators with the reference voltage applied to the inverting input and the input voltage to the non-inverting input. The output of either comparator 42 or 44 is maximum at a negative level when the input voltage is lower than the reference and a maximum positive level when the input exceeds the reference by as little as 0.0001 volts. The maximum negative level reflected in the output is the regulated 5 volt input to the comparator and the maximum positive output is the regulated positive 5 volt input to the comparator.

The inputs to comparators 42 and 44 are analog voltages which are adjusted by controlling the gain of operational amplifiers 41 and 43 so that the potential is 3.5 volts when the oxygen probe senses the desired oxygen content in the pond. The reference potential at the reference inputs to comparators 42 and 44 is set 3.5 volts so that the outputs of the comparators will swing to the negative maximum of a minus 5 volts when the input is under the reference or less than 3.5 volts and swing to the positive maximum or plus 5 volts when the input is over the reference of 3.5 volts.

The outputs of the comparators are coupled to the following stages via diodes 45 and 46 which function as recitifiers so that the effective output of the comparators is 0 when the outputs of amplifiers 41 and 43 are 3.5 volts or less. Under this condition, the outputs of the comparators are at a minus 5 volts which the rectifiers 45 and 46 block causing a 0 potential to be applied to AND gates 47 and 48.

AND gates 47 and 48 are logically interconnected with gates 49 and 50 to form a logic latching circuit which determines whether the output state of the regulator should be on or off.

To more fully understand the logic of the latching circuit, assume that the pond oxygen level is above the desired minimum level. Under this condition, the outputs of amplifiers 41 and 43 will be above 3.5 volts. Thus the inputs to comparators 42 and 44 will be above the 3.5 volt reference level and the outputs of both comparators will be high. This will place a positive potential on one input of AND gate 48 through diode 46. The other input to AND gate 48 is high and since this is a series 7408 AND gate, the output will be high. The high or true output of AND gate 48 is applied to one input of AND gate 47 which, under the exemplary conditions, is receiving a high from diode 45 at its other input. This trues AND gate 47 and a high output is applied to OR gate 50. OR gate 50 is a 7432 series OR gate or equivalent so that whenever one of its inputs is true or high, it will produce a high output. The high or positive output of OR gate 50 is applied to one input of AND gate 49 which is enabled by the high output of AND gate 48 to produce a second positive input to OR gate 50.

The output of OR gate 50 is also applied to the base of transistor 51 causing it to conduct and energize relay 15, opening the relay and terminating a path for current to output recepticle 11 of FIG. 1.

As the oxygen in the pond becomes depleted, the output of oxygen probe 20 decreases and the outputs of amplifiers 41 and 43 decrease. Both amplifiers are adjusted to produce the optimum 3.5 volt output when the oxygen level is at the desired value, however in actual operation, amplifier 41 is set so that its gain is slightly less than amplifier 43. Thus as the output of oxygen probe 20 decreases, amplifier 41 will fall below the 3.5 optimum voltage before amplifier 43. When this unbalanced situation occurs as the oxygen is depleted, comparator 42 switches to a low output and a 0 potential is applied through diode 45 to AND gate 47. This causes the output of AND gate 47 to drop to 0. This has no immediate affect on resistor 51 however because AND gate 48 is still true and applying a high potential through AND gate 49 and OR gate 50. As the oxygen level is further depleted in the pond, amplifier 43 falls below a 3.5 output and the output of diode 46 drops to 0 as does the output of AND gate 48, 49 and OR gate 50. This inhibits the conduction of transistor 51 and relay 15 becomes de-energized. When relay 15 is de-energized, the normally closed contacts close and a path for current is provided to output recepticle 11 of FIG. 1, turning on the aerator.

As the oxygen level increases, first the output of amplifier 43 and then the output of amplifier 41 exceed 3.5 volts. As soon as the outputs of both amplifiers exceed the 3.5 volt level, transistor 51 will be energized as previously discussed and the normally closed contact of relay 15 will be open to terminate the operation of the aerator.

Figure 4:
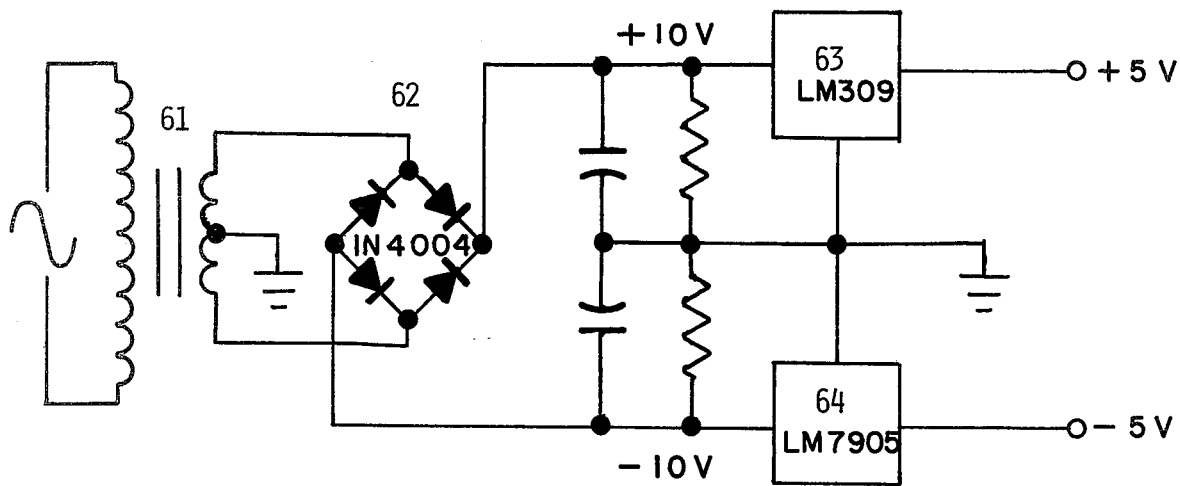
FIG. 4 is a schematic diagram of the regulated power supply required by the dissolved oxygen regulator circuit.

FIG. 4 is a schematic diagram of the power source 18 of FIG. 1 which supplies the regulated voltages utilized by the circuitry of FIG. 3. The 115 volt power source is applied to the primary winding of a step down transformer 61 which produces 12.6 volts across its center tapped secondary winding. The 12.6 volts is applied across a full wave bridge rectifier 62 resulting in a positive 10 volt and a negative 10 volt output. The positive 10 volt output of bridge rectifier 62 is applied to a positive 5 volt regulator 63 which may be an LM309 series regulator. The negative 10 volts developed by the bridge rectifier is applied to a negative 5 volt regulator which in a preferred embodiment may be an LM7905T series device.

When this system is implemented in the field, a single regulator may be used to control a plurality of mechanical aerators and sound appropriate alarms such as warning means 27 of FIG. 1 which may be an audio or visual alert or a combination of the two.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An apparatus for controlling the oxygen level in a body of water, comprising: an oxygen sensor means for producing a voltage representative of the amount of oxygen in said body of water; an aerator for spraying water from said body of water over the surface of said body of water; a control means responsive to said oxygen sensor for selectively energizing said aerator; a regulator for producing a first control voltage in response to said output voltage of said oxygen sensor equalling or exceeding a predetermined value and producing a second control voltage when said oxygen sensor output voltage is less than said predetermined value; and switch means responsive to said first and second control voltages for selectively activating and deactivating said aerator.

2. An apparatus as defined in claim 1 wherein said aerator includes a water pump driven by an electric motor responsive to said switch means.

3. An apparatus for controlling the oxygen level in a body of water, comprising:
   an oxygen sensor means for producing a voltage representative of the amount of oxygen in said body of water;
   an aerator for spraying water from said body of water over the surface of said body of water;

a control means responsive to said oxygen sensor for selectively energizing said aerator;

a regulator for producing a first control voltage in response to said output voltage of said oxygen sensor equalling or exceeding a predetermined value and producing a second control voltage when said oxygen sensor output voltage is less than said predetermined value;

switch means responsive to said first and second control voltages for selectively activating and deactivating said aerator;

said aerator including a water pump driven by an electric motor responsive to said switch means;

a first comparator channel including a reference voltage input and an input from said oxygen sensor for producing first and second logic levels;

a second comparator channel in parallel with said first comparator channel including a reference voltage input and an input from said oxygen sensor for producing first and second logic levels; and logic means responsive to said first and second logic levels produced by said first and second comparator channels for generating said first and second control voltages.

4. An apparatus as defined in claim 3 wherein said logic means comprises;

a first logic gate for producing a first logic level output in response to a first logic level input from said second comparator channel;

a second logic gate for producing a first logic level output in response to a first logic level input from said first logic gate and said first comparator channel;

a third logic gate including first and second inputs for producing a first logic level output when either or both of said inputs are at a first logic level;

a fourth logic gate responsive to a first logic level input from said first logic level gate and a first logic level input from said third logic gate for producing a first logic level;

said first and second inputs to said third logic gate means electrically connected to the outputs of said second and fourth logic gate means respectively; and means to couple the output of said third logic gate means to said switch means.

5. An apparatus as defined in claim 4 wherein said oxygen sensor comprises:

a regulated source of DC power;

a cathode coupled to said regulated source of DC power;

an anode for producing said voltage output of said oxygen sensor;

a housing including an oxygen permeable membrane enclosing said anode and said cathode; and a dielectric medium in said housing between said cathode and said anode, said dielectric medium having the property of varying an electrical conductivity as a function of the amount of dissolved oxygen contained in said dielectric medium.

6. An apparatus as defined in claim 5 further including a thermistor in parallel with said cathode and anode for compensating for temperature variations in said oxygen sensor.

7. An apparatus as defined in claim 6 wherein said switch means comprises:

a normally closed relay; and a transistor for energizing said normally closed relay in response to said first logic level from said third logic gate means.

8. An apparatus as defined in claim 7 wherein said first comparator channel comprises:

a first differential amplifier; and a first operational amplifier for coupling said output voltage of said oxygen sensor to said first differential amplifier, said first operational amplifier adjusted to provide a first gain factor; and said second comparator channel comprises:

a second differential amplifier; and a second operational amplifier for coupling said voltage output of said oxygen sensor to said second differential amplifier, said second operational amplifier adapted to provide a second gain factor different from said first gain factor.

9. An oxygen level control means, comprising:

an oxygen sensor for producing a variable voltage as a function of sensed oxygen;

a first comparator channel including a reference voltage input and an input from said oxygen sensor for producing first and second logic levels;

a second comparator channel in parallel with said first comparator channel including a reference voltage input and an input from said oxygen sensor for producing first and second logic levels; and logic means responsive to said first and second logic levels produced by said first and second comparator channels for generating first and second control voltage.

10. An apparatus as defined in claim 9 wherein said logic means comprises;

a first logic gate for producing a first logic level output in response to a first logic level input from said second comparator channel;

a second logic gate for producing a first logic level output in response to a first logic level input from said first logic gage and said first comparator channel;

a third logic gate including first and second inputs for producing a first logic level output when either or both of said inputs are at a first logic level;

a fourth logic gate responsive to a first logic level input from said first logic level gate and a first logic level input from said third logic gate for producing a first logic level;

said first and second inputs to said third logic gate means electrically connected to the outputs of said second and fourth logic gate means respectively; and means to couple the output of said third logic gate means to said switch means.

11. An apparatus as defined in claim 10 wherein said oxygen sensor comprises:

a regulated source of DC power;

a cathode coupled to said regulated source of DC power;

an anode for producing said voltage output of said oxygen sensor;

a housing including an oxygen permeable membrane enclosing said anode and said cathode; and a dielectric medium in said housing between said cathode and said anode, said dielectric medium having the property of varying an electrical conductivity as a function of the amount of dissolved oxygen contained in said dielectric medium.

12. An apparatus as defined in claim 11 further including a thermistor in parallel with said cathode and anode for compensating for temperature variations in said oxygen sensor.

13. An apparatus as defined in claim 12 wherein said first comparator channel comprises:
- a first differential amplifier; and
- a first operational amplifier for coupling said output voltage of said oxygen sensor to said first differential amplifier, said first operational amplifier adjusted to provide a first gain factor; and said second comparator channel comprises:
- a second differential amplifier, and
- a second operational amplifier for coupling said voltage output of said oxygen sensor to said second differential amplifier, said second operational amplifier adapted to provide a second gain factor different from said first gain factor.

* * * * *